(12) United States Patent
Tsugimura

(10) Patent No.: US 9,304,724 B2
(45) Date of Patent: Apr. 5, 2016

(54) DATA GENERATING DEVICE FOR GENERATING DOCUMENT FILE NOT HAVING FIRST TYPE OF CONTENT DATA USING DOCUMENT FILE HAVING FIRST TYPE OF CONTENT DATA

(71) Applicant: BROTHER KOGYO KABUSHIKI KAISHA, Nagoya-shi, Aichi-ken (JP)

(72) Inventor: Koichi Tsugimura, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/334,957

(22) Filed: Jul. 18, 2014

(65) Prior Publication Data

US 2015/0022857 A1 Jan. 22, 2015

(30) Foreign Application Priority Data

Jul. 19, 2013 (JP) .................................. 2013-150570

(51) Int. Cl.
*G06F 3/12* (2006.01)

(52) U.S. Cl.
CPC ............ *G06F 3/1244* (2013.01); *G06F 3/1206* (2013.01); *G06F 3/1211* (2013.01); *G06F 3/1288* (2013.01)

(58) Field of Classification Search
CPC ... G06F 3/1244; G06F 3/1206; G06F 3/1288; G06F 3/1211

USPC .................................. 358/1.1–3.29, 1.11–1.18
See application file for complete search history.

(56) References Cited

U.S. PATENT DOCUMENTS

| 2006/0290960 | A1* | 12/2006 | Matsuhira ..................... | 358/1.12 |
| 2009/0288128 | A1* | 11/2009 | Oida et al. .................... | 725/112 |
| 2010/0265541 | A1* | 10/2010 | Torii ............................ | 358/1.15 |

FOREIGN PATENT DOCUMENTS

| JP | 2000-148340 A | 5/2000 |
| JP | 2001-306449 A | 11/2001 |
| JP | 2007-041914 A | 2/2007 |

* cited by examiner

*Primary Examiner* — Marcellus Augustin
(74) *Attorney, Agent, or Firm* — Merchant & Gould P.C.

(57) ABSTRACT

A data generating device may be provided with a processor; and a memory storing computer-readable instructions therein. The computer-readable instructions, when executed by the processor, may cause the data generating device to perform: acquiring a first document file; identifying a first type of content data described in the first document file, the first type of content data being content data by which a content to be outputted is changeable in a state where an image represented by the first document file is displayed on a display device; generating a second document file in a case where the first type of content data is identified, the second document file not having the first type of content data described by using the first document file; and sending the second document file to the external device.

10 Claims, 7 Drawing Sheets

DATA GENERATING DEVICE FOR GENERATING DOCUMENT FILE NOT HAVING FIRST TYPE OF CONTENT DATA USING DOCUMENT FILE HAVING FIRST TYPE OF CONTENT DATA

CROSS-REFERENCE TO RELATED APPLICATIONS

This application claims priority to Japanese Patent Application No. 2013-150570, filed on Jul. 19, 2013, the contents of which are hereby incorporated by reference into the present application.

TECHNICAL FIELD

An art disclosed in this specification relates to a data generating device that is communicably connected to an external device.

DESCRIPTION OF RELATED ART

There has been known a data distribution system that sends data through the Internet. Upon receiving a data sending request from a terminal device, the data distribution system determines a type of the terminal device from which the data sending request was sent and an communication environment that the terminal device is in. On the basis of a result of the determination, the data distribution system slims down three-dimensional data that is to be sent and then sends the three-dimensional data.

SUMMARY

The aforementioned art does not take slimming down of a document file into account, although slimming down of three-dimensional data is disclosed. This specification provides an art that a document file that is to be sent may be slimed down.

An art disclosed herein relates to a data generating device configured to be communicably connected to an external device. The data generating device may comprise a processor; and an instruction memory storing computer-readable instructions therein. The computer-readable instructions, when executed by the processor, may cause the data generating device to perform: acquiring a first document file; identifying a first type of content data included in the first document file, the first type of content data being content data by which a content to be outputted is changeable in a state where an image represented by the first document file is displayed on a display device; generating a second document file by using the first document file, in a case where the first type of content data is identified, the second document file not having the first type of content data described; and sending the second document file to the external device.

It should be noted that a control method for achieving the data supplying device, a computer program for achieving the data supplying device, and a computer-readable recording medium in which to store the computer program are also novel and useful. Further, a communication system including the data supplying device and an external device is also novel and useful.

Figure 1:
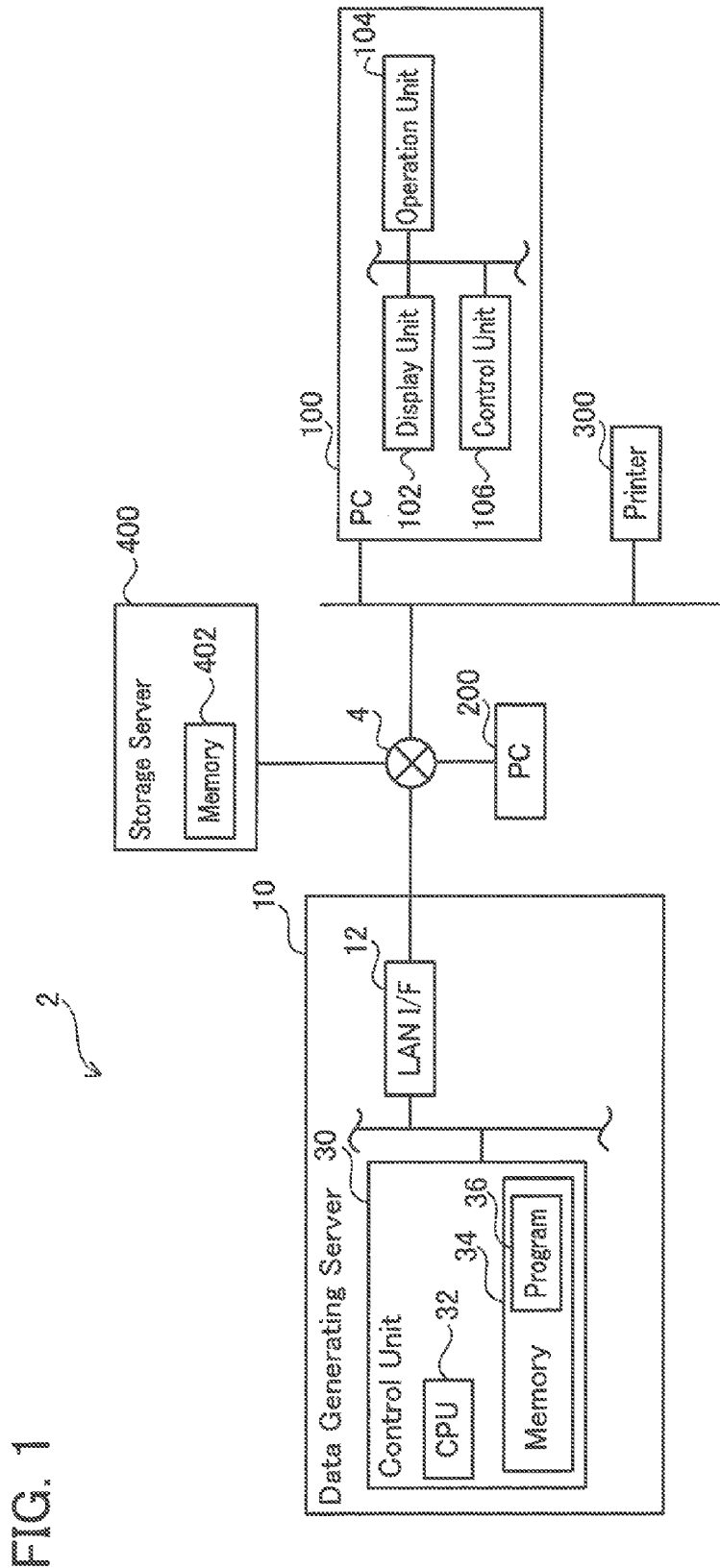
FIG. 1 shows a configuration of a communication system.

EMBODIMENTS (First Embodiment)
(Configuration of a Communication System)
As shown in FIG. 1, a communication system 2 includes a data generating server 10, PCs 100 and 200, a printer 300, and a storage server 400.

The data generating server 10 is capable of communicating with each of the devices 100, 200, 300, and 400 through the Internet 4. Each of the PCs 100 and 200 is capable of communicating with the storage server 400 through the Internet 4.

(Configuration of the Data Generating Server 10)
The data generating server 10 includes a LAN interface 12 and a control unit 30. The LAN interface 12 is an interface through which the data generating server 10 communicates with the Internet 4.

The control unit 30 includes a CPU 32 and a memory 34. The CPU 32 executes various processes in accordance with a program 36 stored in the memory 34. The memory 34 is constituted by ROM, RAM, a hard disk, or the like. In the memory 34, the program 36, which is executed by the CPU 32, is stored.

(Configurations of the PCs 100 and 200)
The PC 100 includes a display unit 102, an operation unit 104 and a control unit 106. By operating the operation unit 104, a user can cause the PC 100 to generate a document file. The document file is a PDF (which is the abbreviation of Portable Document Format) data file. In a PDF document file, one or more items of object data are described. In other words, it can also be said that in a PDF document file, one or more items of object data are embedded. A PDF document file has a tree structure of one or more items of object data.

Object data described in the document file is any one of the following items of content data: text data; moving image data, such as data in FLV (which is the abbreviation of Flash Video) format; still image data, such as data in JPEG (abbreviations of Joint Photographic Experts Group) format; and audio data such as data in MP3 (which is the abbreviation of MPEG Audio Layer-3) format. The content data is data that is outputted by an output device such as the display unit 102. For example, by executing a predetermined operation on the operation unit 104 in a state where an image represented by the document file is displayed on the display unit 102, the user can replay a moving image represented by the moving image data. Further, for example, by executing a predetermined operation on the operation unit 104 in a state where the image represented by the document file is displayed on the display unit 102, the user can replay a sound represented by the audio data. That is, the moving image data and the audio data are each data by which a content to be outputted is changeable in a state where the image represented by the document file is displayed on the display unit 102. In the following, content data by which a content to be displayed is changeable in a state where the image represented by the document file is displayed on the display unit 102 is referred to as "first type of content data".

Meanwhile, while the user can change the size of an image represented by the text data by executing a predetermined operation on the operation unit 104 in a state where the image represented by the document file is displayed on the display unit 102, the user cannot change the content to be displayed. That is, the text data is data by which the content to be displayed is unchangeable in a state where the image represented by the document file is displayed on the display unit 102. In the following, content data by which the content to be displayed is unchangeable in a state where the image represented by the document file is displayed on the display unit 102 is referred to as "second type of content data". Similar to the text data, the still image data is a second type of content data. The one or more items of object data further include positional information indicating the position of content data in the image represented by the document file.

The control unit 106 includes a CPU and a memory. The control unit 106 executes a process in accordance with an operation that the user executes on the operation unit 104. The PC 200 has a configuration which is similar to that of the PC 100.

(Configuration of the Printer 300)

The printer 300 has a printing mechanism of an inkjet type, a laser type, or the like. The printer 300 executes a printing process upon receiving data on which the printing process is to be executed. In the printing process, the printer 300 prints, on a printing medium set in the printer 300, an image represented by the data on which the printing process is targeted.

(Configuration of the Storage Server 400)

The storage server 400 includes a memory 402. The memory 402 is constituted by ROM, RAM, a hard disk, or the like. The storage server 400 can store data that is sent (i.e. uploaded) from the data generating server 10 through the Internet 4. The storage server 400 can store, in the memory 402, one or more folders in which to store data. The storage server 400 is given a unique URL (the abbreviation of Uniform Resource Locator) that indicates the position of a folder on the Internet 4.

Figure 2:
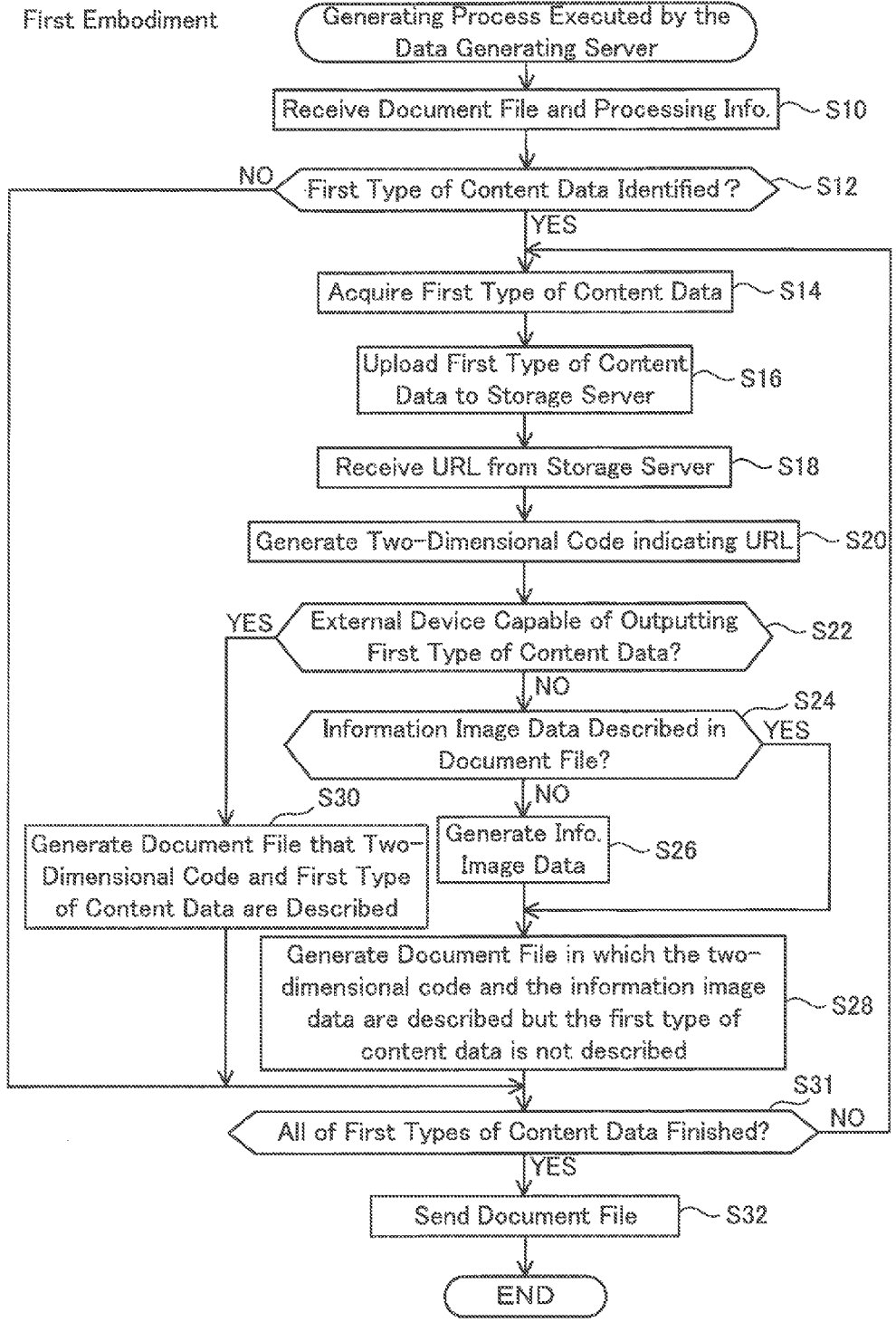
FIG. 2 shows a flow chart of a generating process that is executed by a data generating server of First Embodiment.

(Generating Process Executed by the Data Generating Server 10; FIG. 2)

While the data generating server 10 is in operation, the CPU 32 of the data generating server 10 monitors reception of a combination of a document file and processing information from an external device such as the PC 100 or 200 through the Internet 4. The processing information indicates a process that is to be executed on the document file combined with the processing information. Further, the processing information includes address information (e.g. an IP address) of an external device (e.g. the printer 300) to which the document file is sent. Further, in a case where the process that is to be executed on the document file is a printing process, the processing information includes printing conditions (such as paper size and the number of copies to be printed) set by the user.

As shown in FIG. 2, in S10, the CPU 32 receives a combination of a document file and processing information sent from an external device. Then, in S12, the CPU 32 identifies a first type of content data from the document file received in S10. Specifically, the CPU 32 sequentially checks the content(s) of one or more items of object data described in the document file. In a case where an item of object data being checked includes information indicating that it is a first type of content data, the CPU 32 identifies the item of object data being checked as a first type of content data. In this way, the CPU 32 identifies one or more first types of content data included in the document file received in S10.

If one or more first type of content data are identified in S12 (YES in S12), the CPU 32 proceeds to S14, and if a first type of content data is not identified in S12 (NO in S12), the CPU 32 proceeds to S32. In S14, the CPU 32 acquires, from the document file, one of the one or more first types of content data identified in S12. Specifically, the CPU 32 generates, separately from the document file, a copy of a single first type of content data identified in S12. That is, in S14, the first type of content data is not erased from the document file, but is maintained in a state where it is described in the document file. In a modification, in acquiring, from the document file, a single first type of content data specified in S12, the CPU 32 may erase, from the document file, the first type of content data thus acquired.

Then, in S16, the CPU 32 uploads, through the Internet 4 onto the storage server 400, a content file including the first type of content data acquired in S14. This eliminates the need for the data generating server 10 to store the first type of content data. Next, in S18, the CPU 32 receives, from the storage server 400, a URL indicating the position on the Internet 4 of the content file stored in the storage server 400. Then, in S20, the CPU 32 generates a two-dimensional code indicating the URL received in S18. Further, the CPU 32 generates a second type of content data representing the two-dimensional code thus generated. In a modification, the CPU 32 may generate a bar code, a character string, or a path name indicating the URL received in S18.

Once the two-dimensional code is generated, the CPU 32 determines, in S22, whether or not the external device to which the document file is sent is capable of outputting the content of the first type of content data in a changeable manner. Specifically, by using the address information included in the processing information received in S10, the CPU 32 sends, to the external device, an inquiry as to whether or not the external device is capable of outputting a moving image or sound represented by the first type of content data identified in S12. The inquiry includes information indicating the data format (e.g. FLV format) of the first type of content data. Then, the CPU 32 receives a reply to the inquiry from the external device. In a case where the reply thus received includes information indicating that the external device is capable of outputting the first type of content data, the CPU 32 determines that the external device is capable outputting the first type of content data (YES in S22), and proceeds to S30. On the other hand, in a case where the reply thus received includes information indicating that the external device is not capable outputting the first type of content data, the CPU 32 determines that the external device is not capable outputting the first type of content data (NO in S22), and proceeds to S24.

In S30, the CPU 32 generates a document file in which the second type of content data representing the two-dimensional code generated in S20 and the first type of content data identified in S12 are described. Specifically, the CPU 32 describes, in the document file, the second type of content data representing the two-dimensional code generated in S20. Furthermore, the CPU 32 generates positional information indicating the position of the two-dimensional code on the image represented by the document file, and describes the positional information in the document file. The CPU 32 generates positional information for placing the two-dimensional code in a position on the image represented by the document file that is adjacent to the moving image represented by the first type of content data identified in S12, and describes the positional information in the document file.

Once the document file is generated, the CPU 32 proceeds to S32. In S30, the CPU 32 generates the document file in a data format (i.e. PDF format) that is the same as the data format of the document file received in S10.

Meanwhile, in S24, the CPU 32 determines whether or not information image data representing an image, which indicates that a first type of content data is described, is described in the document file received in S10. In a case where the first type of content data is moving image data, the information image data may be still image data representing an image included in the moving image represented by the first type of content data (e.g. an image that is shown 0 second after the start of a replay of the moving image), or may be text data indicating a title of the moving image. In a case where the first type of content data is audio data, the information image data may be still image data representing a replay button, or may be text data indicating the title of a sound. The CPU 32 identifies the information image data from the document file in a similar manner to S12. It should be noted the information image data is a second type of content data.

If the CPU 32 determines that information image data is described (YES in S24), the CPU 32 skips S26 and proceeds to S28. If the CPU does not determine that information image data is described (NO in S24), the CPU proceeds to S26, in which the CPU 32 uses the first type of content data to generate information image data. Specifically, in a case where the first type of content data is moving image data, the CPU 32 generates information image data representing a still image that is shown 0 second after the start of a replay of the moving image. In a case where the first type of content data is audio data, the CPU 32 generates information image data representing a replay button.

In S28, the CPU 32 executes different processes depending on whether or not the process in S26 was executed. In a case where the process in S26 was not executed, the CPU 32 generates a document file in which the second type of content data representing the two-dimensional code generated in S20 and the information image data identified in S24 are described but in which the first type of content data identified in S12 is not described. On the other hand, in a case where the process in S26 was executed, the CPU 32 generates a document file in which the second type of content data representing the two-dimensional code generated in S20 and the information image data identified in S26 are described but in which the first type of content data identified in S12 is not described. In S28, the CPU 32 generates the document file in a data format (i.e. PDF format) that is the same as the data format of the document file received in S10.

Specifically, in a case where the first type of content data identified in S12 is moving image data, the CPU 32 describes the information image data and the positional information of the information image data in the document file so that the image presented by the information image data is placed in a position where the moving image represented by the first type of content data identified in S12 is to be displayed in the image represented by the document file received in S10. Meanwhile, in a case where the first type of content data identified in S12 is audio data, the CPU 32 describes the information image data and the positional information of the information image data in the document file so that the replay button represented by the information image data is placed at the end of the image represented by the document file. Then, the CPU 32 describes the second type of content data representing the two-dimensional code generated in S20 and the positional information of the second type of content data in the document file so that the second type of content data representing the two-dimensional code is placed in a such a position as to overlap the image represented by the information image data.

Figure 3:
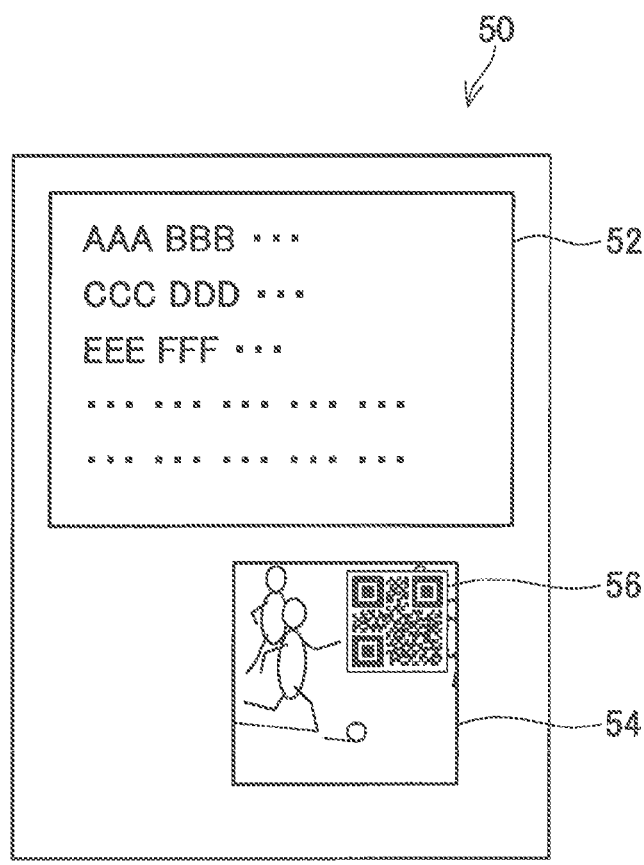
FIG. 3 shows a diagram for explaining the placement of a two-dimensional code.

As shown in FIG. 3, an image 50 represented by a document file generated in S28 has placed thereon an image (e.g. a text image) 52 represented by a second type of content data described in advance in a document file received in S10, an image 54 represented by information image data, and a two-dimensional code 56 represented by a second type of content data generated in S20. The two-dimensional code 56 is placed in such a manner as to overlap the still image 54. In this configuration, it can be easily inferred that the two-dimensional code 56 is a two-dimensional code associated with the still image 54.

Upon completion of S28 or S30, the CPU 32 proceeds to S31, in which the CPU 32 determines whether or not all of the first types of content data identified in S12 have been finished with the process in S14 to S30. If there is a first type of content data yet to be finished with the process in S14 to S30 (NO in S31), the CPU 32 returns to S14. In executing S28 and S30 for the second or subsequent time, the CPU 32 generates a new document file by using the document file that it previously generated in S28 or S30. If having determined that all of the first types of content data identified in S12 have been finished with the process in S14 to S30 (YES in S31), the CPU 32 proceeds to S32. In S32, the CPU 32 designates, as a destination, the address information included in the processing information received in S10, sends the document file generated in S28 or S30 to the destination, and finishes the generating process. Alternatively, in S32, the CPU 32 sends the document file in which no first type of content data was identified in S12 (NO in S12). In a modification, the CPU 32 may first execute the process in S14 to S26 on a first type of content data identified in S12 and then execute the process in S28 or S30 on the first type of content data.

Figure 4:
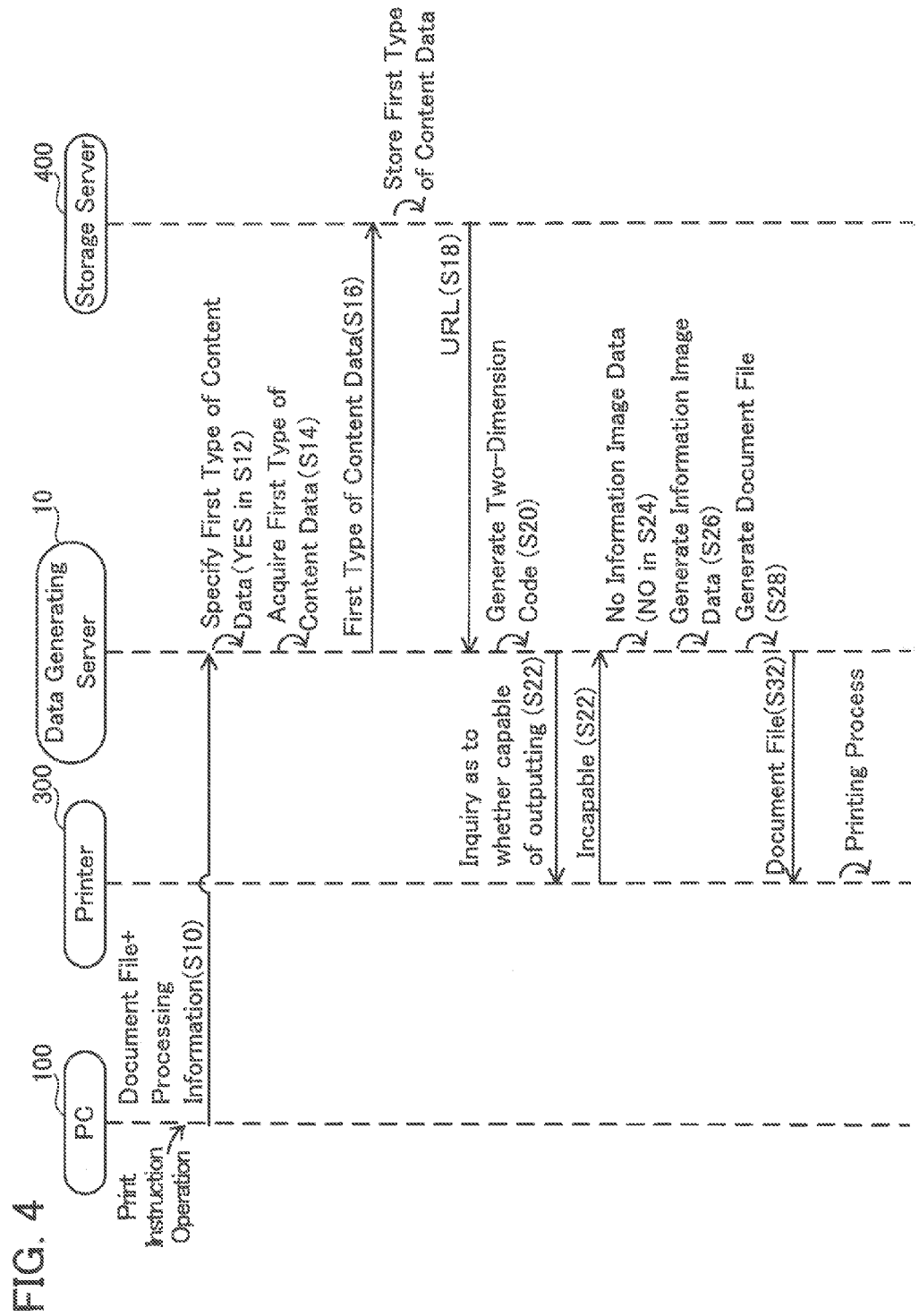
FIG. 4 shows a sequence diagram for explaining a process that is executed by each device that is incapable of outputting a first type of content data.

(Case Where a First Type of Content Data is Unable to be Outputted; FIG. 4)

By operating the operation unit 104, the user of the PC 100 can execute a print instruction operation for causing the printer 300 to execute a printing process on a document file. The print instruction operation includes an operation of selecting a document file that is to be printed, an operation of selecting the printer 300 to execute a printing process, and an operation of setting printing conditions.

Once the print instruction operation is executed, the control unit 106 sends, to the data generating server 10, a combination of processing information and the document file thus selected. The processing information includes the address information of the selected printer 300 and the set printing conditions. Upon receiving the combination of the document file and the processing information (S10 of FIG. 2), the data generating server 10 acquires a first type of content data from the document file (YES in S12 and S14 of FIG. 2) and uploads, onto the storage server 400, a content file including the first type of content data (S16 of FIG. 2).

Upon receiving the content file from the data generating server 10, the storage server 400 stores the content file in the memory 402. Then, the storage server 400 sends, to the data generating server 10 from which the content file was sent, a URL indicating the position on the Internet 4 of the content file stored in the memory 402.

Upon receiving the URL from the storage server 400 (S18 of FIG. 2), the data generating server 10 generates a two-dimensional code indicating the URL (S20 of FIG. 2). Then, the data generating server 10 sends, to the printer 300, an inquiry as to whether or not the printer 300 is capable of outputting the moving image represented by the first type of content data described in the document file (S22 of FIG. 2).

Upon receiving the inquiry, the printer 300 determines, by using information included in the inquiry that indicates the data format of the first type of content data, whether or not the printer 300 is capable of replaying the moving image represented by the first type of content data. Specifically, in a case where the printer 300 has stored in its memory a program for replaying a moving image represented by a first type of content data, the printer 300 determines that it is capable of replaying the moving image represented by the first type of content data, and in a case where the printer 300 does not have such a program stored in its memory, the printer 300 determines that it is incapable of replaying the moving image represented by the first type of content data. Upon determining that it is incapable of replaying the moving image represented by the first type of content data, the printer 300 sends, to the data generating server 10 from which the inquiry was sent, information indicating that it is incapable of replaying the moving image represented by the first type of content data.

Upon receiving, from the printer 300, the information indicating that it is incapable of replaying the moving image represented by the first type of content data (NO in S22 of FIG. 2), the data generating server 10 determines whether or not there is information image data described in the document file (S24 of FIG. 2). If having determined that there is no information image data is described in the document file (S24 of FIG. 2), the data generating server 10 generates information image data (S26 of FIG. 2). Then, the data generating server 10 generates a document file in which the second type of content data representing the two-dimensional code and the information image data thus generated are described but in which the first type of content data is not described (S28 of FIG. 2). Then, the data generating server 10 sends, to the printer 300, the document file thus generated and printing condition information included in the processing information (S32 of FIG. 2).

Upon receiving the document file and the printing condition information, the printer 300 determines whether or not the document file is data that is in a data format that can be interpreted. In a case where the document file is data that is in a data format that can be interpreted, the printer 300 executes a printing process of printing the image (see FIG. 3) represented by the document file on a printing medium in accordance with the printing condition information. On the other hand, in a case where the document file is not data that is in a data format that can be interpreted, the printer 300 sends the document file to a conversion server (not illustrated) for converting document file into data that is in a data format that can be interpreted by the printer 300 (e.g. into PDF (which is the abbreviation of Portable Document Format) data). Upon receiving the file thus converted from the conversion server, the printer 300 executes a printing process of printing the image represented by the file thus converted on a printing medium in accordance with the printing condition information.

In a case where the printer 300 is incapable of replaying the moving image represented by the first type of content data, the data generating server 10 sends, to the printer 300, a document file in which no first type of content data is described. This configuration eliminates the need to send the first type of content data, which is comparatively large in data size, to a printer 300 that is not capable of replaying a moving image represented by a first type of content data. This configuration makes it possible to send an appropriate document file in accordance with the function of a printer 300.

Figure 5:
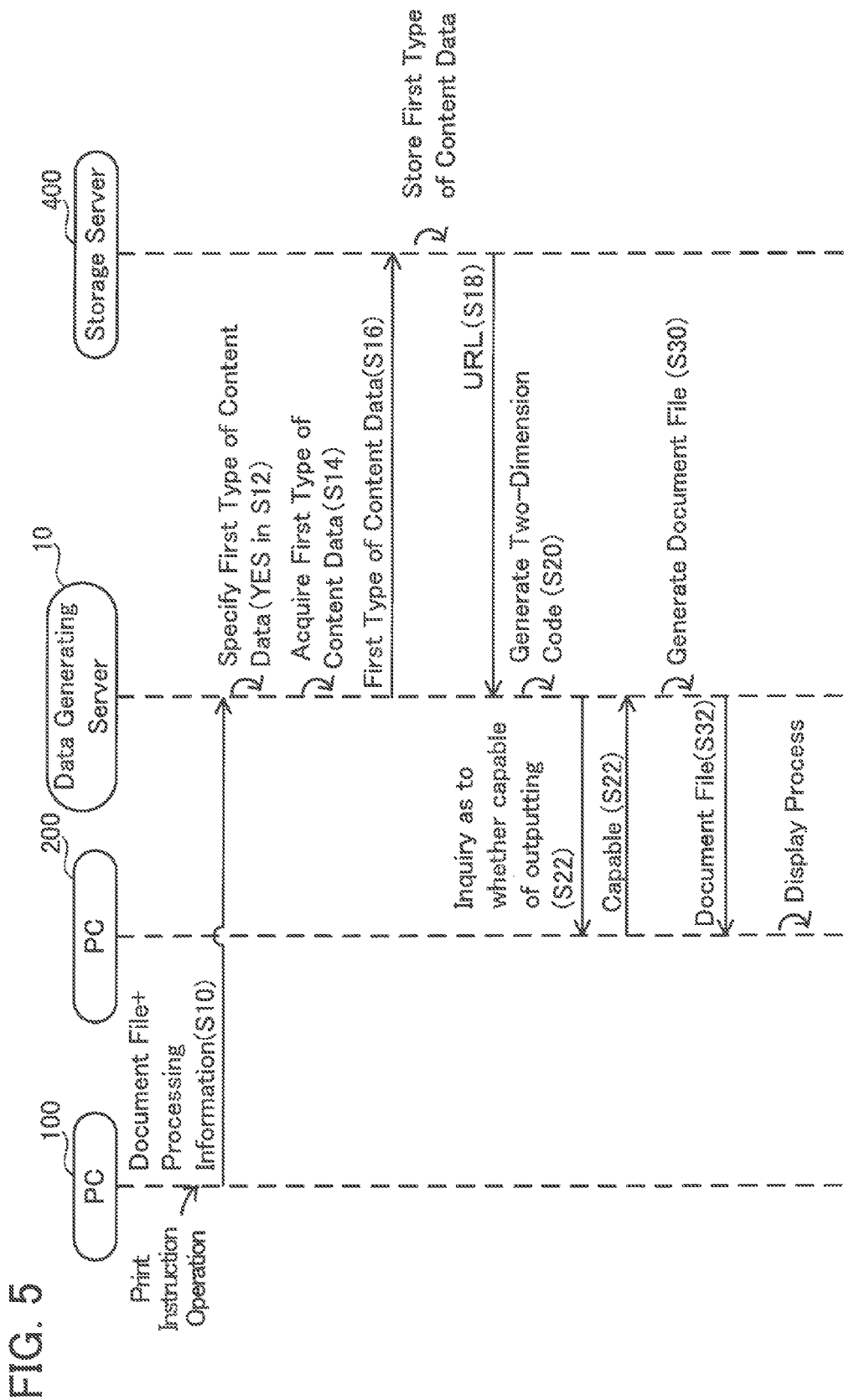
FIG. 5 shows a sequence diagram for explaining a process that is executed by each device that is capable of outputting a first type of content data.

(Case Where a First Type of Content Data is Able to be Outputted; FIG. 5)

By operating the operation unit 104, the user of the PC 100 can execute a sending instruction operation for sending a document file to the PC 200. The sending instruction operation includes an operation of selecting a document file that is to be sent and an operation of selecting the PC 200 to which the document file is sent.

Once the sending instruction operation is executed, the control unit 106 sends, to the data generating server 10, processing information including the selected document file and the address information of the selected PC 200. The processes in the respective devices from the point in time where the data generating server 10 receives the combination of the document file and the processing information (S10 of FIG. 2) to the point in time where the data generating server 10 generates a two-dimensional code indicating a URL (S20 of FIG. 2) are the same as those shown in FIG. 4, and as such, are not described here.

The data generating server 10 sends, to the PC 200, an inquiry as to whether or not the PC 200 is capable of outputting the moving image represented by the first type of content data described in the document file (S22 of FIG. 2).

Upon receiving the inquiry, the PC 200 determines, by using information included in the inquiry that indicates the data format of the first type of content data, whether or not the PC 200 is capable of replaying the moving image represented by the first type of content data. Similar to the printer 300, in a case where the PC 200 has stored in its memory a program for replaying a moving image represented by a first type of content data, the PC 200 determines that it is capable of replaying the moving image represented by the first type of content data, and in a case where the PC 200 does not have such a program stored in its memory, the PC 200 determines that it is incapable of replaying the moving image represented by the first type of content data. Upon determining that it is capable of replaying the moving image represented by the first type of content data, the PC 200 sends, to the data generating server 10 from which the inquiry was sent, information indicating that it is capable of replaying the moving image represented by the first type of content data.

Upon receiving, from the PC 200, the information indicating that it is capable of replaying the moving image represented by the first type of content data (YES in S22 of FIG. 2), the data generating server 10 generates a document file in which the second type of content data representing the two-dimensional code and the first type of content data are described, without generating information image data (S30 of FIG. 2). Then, the data generating server 10 sends the document file thus generated to the PC 200 (S32 of FIG. 2).

Upon receiving the document file, the PC 200 executes a display process of displaying the image (see FIG. 3) represented by the document file on the display unit of the PC 200. By operating the operating unit of the PC 200, the user of the PC 200 can replay the moving image represented by the first type of content data.

In a case where the PC 200 is capable of replaying the moving image represented by the first type of content data, the data generating server 10 sends, to the PC 200, the document file in which the first type of content data is described. The PC 200 can appropriately output the first type of content data. This configuration makes it possible to send an appropriate document file in accordance with the function of a PC 200.

Effects of the Present Embodiment)

The data size of a first type of content data is usually larger than the data size of information image data. In a document file that is sent to a printer 300, no first type of content data is described (S28 of FIG. 2). This configuration makes it possible to, by using a document file, generate a document file that is comparatively small in data size. This makes it possible to slim down a document file that is to be sent.

In a document file that is sent from the data generating server 10, a two-dimensional code representing a URL indicating the position where a first type of content data is stored is described. This configuration makes it possible to view the two-dimensional code by displaying or printing the image represented by the document file that is sent from the data generating server 10. For example, reading the two-dimensional code by using a portable terminal allows access through the portable terminal to the first type of content data stored in the storage server 400. This configuration makes it possible to view the content of the first type of content data by using the image represented by the document file, even in a case where the first type of content data is erased from the document file.

In a document file that is sent from the data generating server 10, information image data is described. This configuration makes it possible to find, in accordance with the image represented by the document file, that a first type of content data is included in a document file sent from the PC 100.

If it is not determined that information image data is described (NO in S24), the data generating server 10 generates information image data. This configuration makes it possible to, even in a case where no information image data is described in a document file received from the PC 100, generate a document file in which information image data is described.

On the other hand, if it is determined that information image data is described (YES in S24), the data generating server 10 does not generate information image data. This configuration makes it possible to reduce the processing load with which a document file is generated.

In a case where an image represented by a document file is printed by the printer 300, an image represented by a first type of content data in a printed result is unable to be changed. That is, all of the contents included in the first type of data cannot be grasped even by confirming the printed result. Further, in a configuration in which the first type of content data per se is converted into a two-dimensional code, if any, the whole first type of content data may not be converted into a two-dimensional code, as the data size of the first type of content data is large. In the present embodiment, a document file in which a second type of content data indicating the position where a content file including the first type of data is stored is described is sent to the printer 300. This allows the printer 300 to print the two-dimensional code so that the two-dimensional code is acquired from the printed result. This makes it possible to, by using the two-dimensional code thus acquired, access a content file stored in the storage server 400. This configuration makes it possible to supply an appropriate document file to the printer 300 in a case where an image represented by a document file based on a document file in which content data is described is to be printed.

On the other hand, in a case where an image represented by a document file is sent to the PC 200, the data generating server 10 sends, to the PC 200, a document file in which a first type of content data is described. This configuration allows the PC 200 to changeably display, on the display unit of the PC 200, the image represented by the first type of content data. This configuration makes it possible to supply an appropriate document file to the PC 200 in a case where an image represented by a document file is to be displayed.

(Correspondence Relationship)

The data generating server 10 is an example of a "data generating device". The PCs 100 and 200 and the printer 300 are each an example of an "external device". The memory 402 is an example of a "memory". The document file that is received in S10 is a "first document file, and the document file that is received in S28 is a "second document file". The "URL" indicating the position of a document file on the Internet 4 is an example of "access information", and the two-dimensional code is an example of "image indicating the access information". The information image data is an example of a "second type of content data".

(Second Embodiment)

The present embodiment is described in terms of its difference from First Embodiment. The present embodiment is different from First Embodiment in terms of the content of a generating process that is executed by the data generating sever 10.

Figure 6:
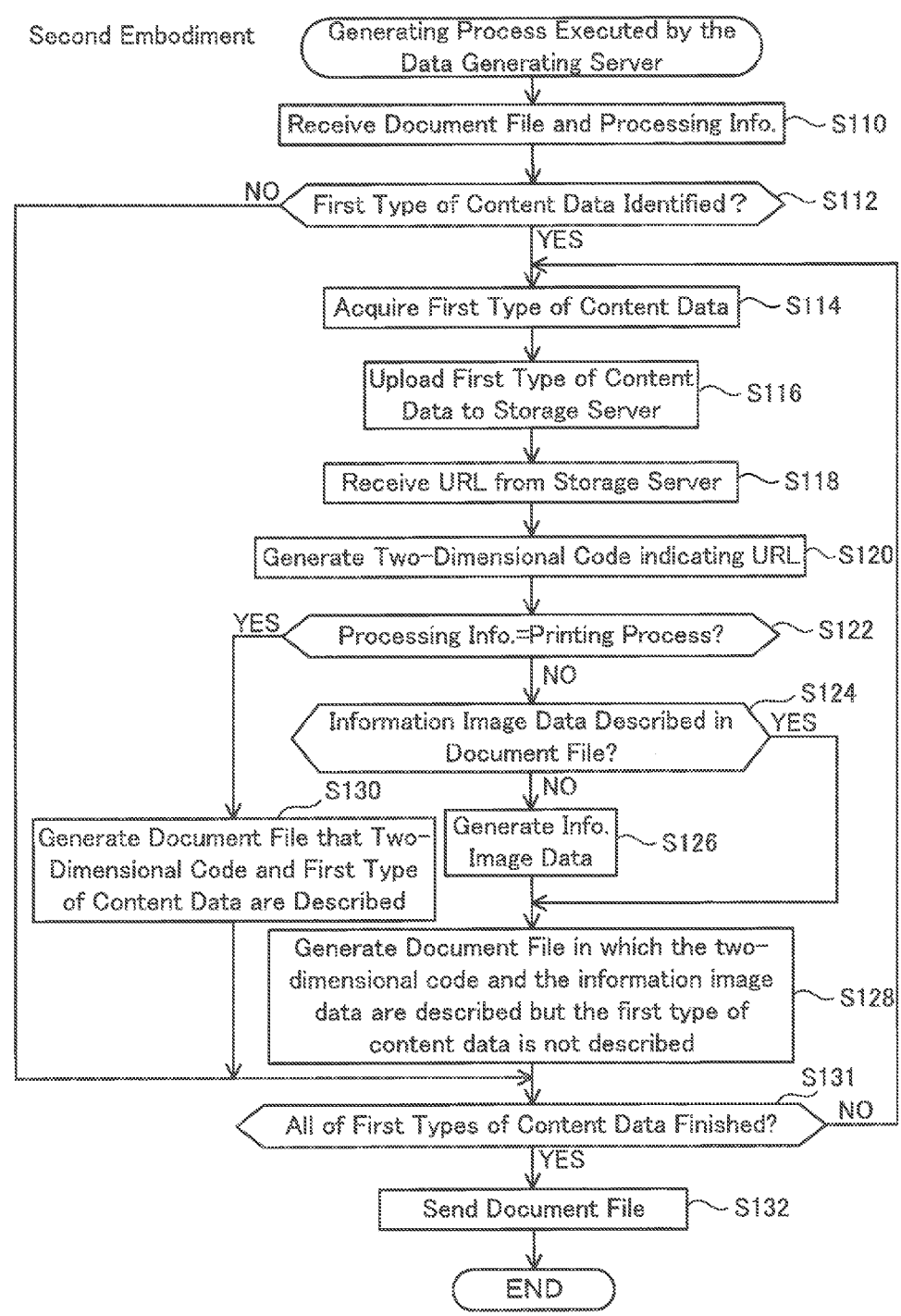
FIG. 6 shows a flow chart of a generating process that is executed by a data generating server of Second Embodiment.

(Generating Process Executed by the Data Generating Server 10; FIG. 6)

As shown in FIG. 6, the process in S110 to S120 is identical to the process in S10 to S20 of FIG. 5. In S122, the CPU 32 determines whether or not a printing process is included in the processing information received in S110. If a printing process is included (YES in S122), the CPU 32 proceeds to S124, and if a printing process is not included (NO in S122), the CPU proceeds to S130. As shown in FIG. 6, the process in S124 to S132 is identical to the process in S24 to S32 of FIG. 5.

In a case where the printing process is executed on a document file, even if a first type of content data is sent to an external device, the external device does not print the content of the first type of content data in a changeable manner. In the present embodiment, in a case where the printing process is executed on a document file, a document file that does not include a first type of content data is sent to the external device. On the other hand, in a case where a process other than the printing process is executed on a document file, the external device may output the content of the first type of content data in the changeable manner. The configuration of the present embodiment makes it possible to send an appropriate document file according to the type of the process that is to be executed on a document file.

(Modifications)

(1) The "data generating device" is not limited to the data generating server 10, and may be another device, such as a PC or a multi-function peripheral, that is communicably connected to an external device. The "external devices" may be functional machines, portable terminals, etc., as well as PCs and printers. The "memory" is not limited to the storage server 400, and may be the memory 34 of the data generating server 10 or the memory of the PC 100 or the like.

(2) The "document file" is not limited to a PDF file, and may be a file that is in a data format in which a first type of content data can be described (e.g. a PPT file). In general, a "document file" is a file in which a first type of content data by which a content to be outputted is changeable in a state where an image represented by the document file is displayed on a display device can be described.

(3) In each of the embodiments described above, the CPU 32 identifies a first type of content data by sequentially checking the content(s) of one or more items of object data described in a document file (S12 of FIG. 2, S112 of FIG. 6). Alternatively, the CPU 32 may identify the first type of content data by identifying, from among character strings described in the document file, a character string (e.g., a character string "FLV") indicating the data format of the first type of content data.

(4) In each of the embodiments described above, in generating a document file in which a first type of content data is described (S30 of FIG. 2, S130 of FIG. 6), the CPU 32 does not generate information image data. Alternatively, in generating a document file in which a first type of content data is described, the CPU 32 may generate information image data and generate a document file in which both a first type of content data and the information image data thus generated are described.

(5) In each of the embodiments described above, in determining whether or not the external device to which a document file is sent is capable of outputting the content of a first type of content data in the changeable manner, the CPU 32 sends the inquiry to the external device (S22 of FIG. 2). However, information indicating whether or not the external device is capable of outputting the content of a first type of content data in the changeable manner may be stored in advance in the data generating server 10. Alternatively, information indicating whether or not the external device is capable of outputting the content of a first type of content data in the changeable manner may be received in combination with the document file from the external device (e.g. the PC 100) from which the document file is sent. Further, the information that is used in the process in S22 of FIG. 2, in the process in S122 of FIG. 6, and in the present modification needs only be information that allows the CPU 32 to determine whether or not the external device is capable of outputting the content of a first type of content data in the changeable manner, instead of being information indicating whether or not the external device is capable of outputting the content of a first type of content data in the changeable manner. For example, the information may be information indicating the type of an external device, i.e. information indicating whether the external device is a printer, a PC, or the like.

(6) In each of the embodiments described above, in a case where the first type of content data is moving image data, the CPU 32 generates information image data representing an image that is shown 0 second after the start of a replay of the moving image (S26 of FIG. 2). Alternatively, the CPU 32 may generate information image data representing an image that is shown at a predetermined point of time in the duration of a replay of the moving image, and the information image data representing an image that is shown at a predetermined period of time after the start of a replay of the moving image may be stored in advance in the data generating server 10. Alternatively, in a case where the first type of content data is moving image data or audio data, the CPU 32 may generate information image data representing a character string indicating information concerning the first type of content data, such as the duration of a replay of the first type of content data and the data size of the first type of content data (S26 of FIG. 2).

Figure 7:
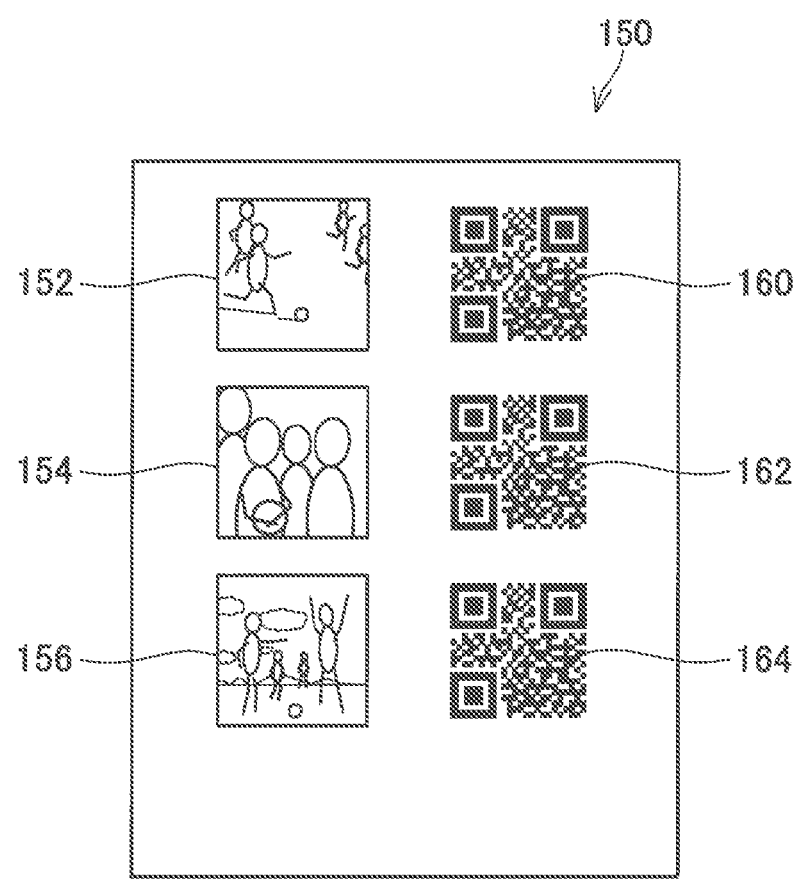
FIG. 7 shows a diagram for explaining the placement of a two-dimensional code of a modification.

(7) In a document file generated in S28 of FIG. 2, the position of the image represented by the information image data is designated so that the image represented by the information image data is placed in the position in which the moving image or the like represented by the first type of content data is placed (FIG. 3). Further, the two-dimensional code is placed in such a manner as to overlap the image represented by the information image data. Alternatively, for example, in a case where a plurality of first types of content data are described in the document file, the CPU 32 may, as shown in FIG. 7, generate a document file in which the image represented by the information image data and a two-dimensional code indicating a URL of a first type of content data corresponding to the information image data are placed next to each other. Alternatively, the CPU 32 may send the two-dimensional code and the document file separately to the printer, and upon receiving the two-dimensional code and the document file, the printer may generate print data in which the two-dimensional code is placed.

(8) In each of the embodiments described above, the CPU 32 may send a document file generated by the data generating server 10 to an external device (e.g. the PC 100) from which the document file is sent. Then, the external device may send the document file generated by the data generating server 10 to a printer that executes a printing process. In this case, the CPU 32 may determine, by using information of the printer that executes a printing process, whether or not the printer is capable of outputting the content of the first type of content data in the changeable manner. Alternatively, in case where the processing information includes printing condition information, the printer may send the document file to a conversion server for converting it into data that is in a format that can be interpreted by the printer.

(9) In each of the embodiments described above, the components of the data generating server 10 are realized by software. However, at least one of the components of the data generating server 10 may be realized by hardware such as a logic circuit.

(10) In each of the embodiments described above, the CPU 32 generates a document file in a data format (i.e. PDF format) that is the same as the data format of the document file received from the PC 100 and sends it to the printer 300 or the like. Alternatively, the CPU 32 may generate a document file in a data format (i.e. PDL format) that is different from the data format of the document file received from the PC 100 and send it to the printer 300 or the like.

(11) The "first type of content data" is not limited to moving image data or audio data. The "first type of content data" may for example by three-dimensional data representing a three-dimensional shape. Such three-dimensional data allows the three-dimensional shape represented by the three-dimensional data to be rotated in a state where an image represented by a document file is displayed on the display device. The "first type of content data" needs only be such data that all information represented by content data cannot be acquired when expressed by printing or two-dimensionally (e.g. displayed on a two-dimensional display), i.e. such data that at least part of the information represented by the content data is missing.

What is claimed is:

1. A data generating dew configured to be communicably connected to an external device, the data generating device comprising:
   a processor; and
   a communication interface being an interface through which the data generating device communicates with the external device; and
   an instruction memory storing computer-readable instructions therein, the computer-readable instructions, when executed by the processor, causing the data generating device to perform:
   acquiring a first document file;
   identifying a first type elf content data included in the first document file, the first type of content data being content data which a content to be outputted is changeable in a state where an image represented by the first document file is displayed on a display device, and the first type of content data including at least one of moving image data, audio data, and three-dimensional data representing a three-dimensional shape;
   in a case where the first type of content data is identified, generating a second document file by using the first document file, the second document file having a second type of content data different from the first type of content data arranged at a position where the first type of content data is to be displayed in the first document file, the second type of content data including information indicating that the first document file describes the first type of content data, the second type of content data being data of which content to be outputted is unchangeable in a state where an image represented by the second document file is displayed on the display device; and sending the second document file to the external device through the communication interface.

2. The data generating device as in claim. 1, wherein the sending includes:

sending a document file in which the first type of content data is described, in a case where the external device is capable of outputting the content f the first type of content data in a changeable manner; and sending the second document file in which the first type of content data is not described, in a case where the external device is not capable of output e content of the first type of content data in the change manner.

3. The data generating device as in claim 1, wherein the computer-readable instructions, when executed by the processor, further causes the data generating device to perform:

acquiring process information indicating process to be executed on the first document file, wherein the sending includes:

sending the second document file to the external device in a case where process information indicating a print process is acquired, and sending a document file in which the first type of content data is described, in a case where the process information indicating the print process is not acquired.

4. The data generating device as in claim 1, wherein the computer-readable instructions, when executed by the processor, further causes the data generating device to perform:

storing the first type of content data described in the first document file in a data memory, wherein the generating includes generating the second document file in which access data representing an image indicating access information for accessing the first type of content data stored in the data memory is described.

5. The data generating device as in claim 4, wherein the data generating device is connected to a storage server, and the storing includes uploading the identified first type of content data to the storage server.

6. The data generating deli claim 1, wherein the generating includes generating the second type of content data by using the first type of content data.

7. The data generating device as in claim 1, wherein the generating includes generating the sewn document file in which the second type of content data obtained by using a still image content arranged at a position where the first type of content data is to be displayed, in a case ere the still image content data indicating the content of the first type of content data is described in the first document file and the still image content data is data of which content to be outputted unchangeable in the state where the image represented by the first document file on the display device.

8. The data generating device as in claim 1, wherein the second document file and the first document file have same data format.

9. The data generating device as in claim 1, wherein the first type of content data includes data of which an image to be displayed is changeable in the state where the image represented by the first document file is displayed.

10. A non-transitory computer readable recording medium which stores computer- readable instructions to be executed by a processor of a data generating device configured to be communicably connected to an external device, the computer-readable instructions causing the processor of the data generating device to perform:

acquiring a first document file;

identifying a first type of content data included in the first document file, the first type of content data being content data by which a e outputted is changeable in a state where an image represented by the first document file is dished on a display device, and the first type of content data including at least one of moving image data, audio data, and three-dimensional data representing a three-dimensional shape;

in a case where the first type of content data identified, generating a second document file by using the first document file, the second document file having a second type of content data different from the first type of content data arranged at a position where the first type of content data is to be displayed in the first document file, the second type of content data including information indicating that the first document file describes the first type of content data, the second type of content data being data of which content to be outputted is unchangeable in a state where an image represented by the second document file is displayed on the display device; and sending the second document file to the external device.

* * * * *